UNITED STATES PATENT OFFICE.

HAROLD G. WEIDENTHAL, OF CLEVELAND, OHIO; LOUISE S. WEIDENTHAL EXECUTRIX OF SAID HAROLD G. WEIDENTHAL, DECEASED.

MOLD FOR METAL-FOUNDERS' USE AND COMPOSITION OF MATTER FOR MAKING SAME.

1,401,215. Specification of Letters Patent. Patented Dec. 27, 1921.

No Drawing. Application filed July 29, 1920. Serial No. 399,705.

*To all whom it may concern:*

Be it known that I, HAROLD G. WEIDENTHAL, a citizen of the United States, residing at Cleveland, in the county of Cuyahoga and State of Ohio, have invented a certain new and useful Improvement in Molds for Metal-Founders' Use and Composition of Matter for Making Same, of which the following is a full, clear, and exact description.

This invention relates to the art of casting in molds and has for its object the provision of a new and permanent type of mold and the provision of a new composition of matter for use in making the same. For the purpose of melting metals the use of crucibles has been known and one of the commonest materials of which such crucibles have been constructed is graphite mixed with clay, a particular kind of clay being generally employed having therein an excess of free silica. This mixture of silica, clay and graphite constitutes about the only composition which has ever proven successful in the manufacture of crucibles, but is unsuited for the manufacture of molds owing to its high coefficient of shrinkage on burning and also owing to the fact that at high casting temperatures a reaction occurs between the graphite and the silica producing free silicon and distintegrating the material. A few attempts have been made to employ this material for molds by first forming bricks or blocks of the same, burning them to a permanent condition and afterward hollowing them out by die-sinking operations. This procedure results in a perfectly practicable mold in cases wherein the shape of the article is sufficiently simple to enable its formation, but the expense of producing such a mold is extremely high. The object of my invention is the provision of a composition of matter of such a nature as can be mixed, molded and burned with an amount of shrinkage which is sufficiently small to fall within the tolerance limits permissible in casting; the provision of a composition of matter for the manufacture of permanent molds which can be mixed and sent out in bulk form and used successfully by the individual founder or mold maker; the provision of a composition of matter which shall possess less tendency toward chemical reaction at high temperatures than those previously employed; while further objects and advantages of the invention will become apparent as the description proceeds.

The requirements of this material are not exactly the same as those of a crucible material. In the first place, shrinkage in a crucible material is not harmful so long as it is not sufficiently great to cause breakage of the article inasmuch as exactness of size or shape is of no importance; whereas in mold making, exactness of size and shape is the prime consideration. In a crucible material a high coefficient of heat conductivity is highly desirable owing to the necessity of melting the contents thereof but in a mold this is a matter of very small moment. A crucible is subjected to the heat of the furnace for a long time and reaches a temperature considerably above that of the charge whereas the mold is subjected to contact with the hot metal only for a short time owing to the rapid chilling of the latter and is always cooler than the metal. In order to secure quick and uniform heating the walls of a crucible must be comparatively thin and the material used must be one which will afford the requisite strength at that thickness, whereas in a mold the requirements of thickness are of minor importance and likewise the requirements of strength can be met either by greater thickness or by reinforcement in other ways.

The essence of my invention consists in the employment of bauxite, preferably in complete substitution for clay, although in some instances I find it possible and even desirable to use a small amount of aluminum silicate as a binder. I use this bauxite both in the raw state and the calcined state; and in addition thereto I preferably employ a certain amount of graphite for the purpose of making the surface of the mold and of rendering the material more easily worked. The purpose of the calcined bauxite is to reduce and control the shrinkage upon burning and the amount of such shrinkage can be accurately controlled by the proportion between the calcined bauxite and the raw bauxite or other binding material; in fact it is possible even to turn the shrinkage into a slight expansion if desired.

In the performance of my said invention, I first calcine a sufficient quantity of bauxite at a suitable temperature to drive off the water of crystallization, for example, at temperatures from 1,000° C. to 1,300° C. after which the calcined material is crushed in a way to afford a graded mixture. I find that if the calcined bauxite be crushed or ground to a uniform size the strength and permanence of the resulting article is much impaired and this impairment increases with the fineness. The preferred limits of crushing lie between about 10 mesh and 100 mesh (reckoned in wires per inch); although for pretty large molds there are some occasions in which the above maximum size may be exceeded. It is very desirable however that within the limits employed a substantially uniformly graded mixture be produced and it is best not to have any large proportion of this ingredient of a smaller size than 100 mesh since the density thereby produced tends to encourage cracking.

The raw bauxite is preferably ground and the finer it is ground, the better, the preferable fineness being that of an impalpable slime. The first part of the grinding may be performed either dry or wet but the last part is best performed wet since the purpose is not only to comminute the material but also to mix it thoroughly with water for binding. The ingredients, namely, crushed calcined bauxite, raw ground bauxite and graphite are now mixed together in the desired proportions which may vary through quite a range, the limits according to my present experience being about as follows for the three materials: namely, calcined bauxite 40% to 75%; raw bauxite (with or without other binder) 5% to 20%; graphite 20% to 40%. In some instances, a clay binder can be used either in conjunction with or in substitution for the raw bauxite. I prefer in such cases to use not more than about ten per cent. of clay, employing raw bauxite for additional binder if any be required; and when clay is used, I prefer to employ one which is comparatively devoid of free silica.

The amount of binder required depends upon the gradation of the particles of calcined bauxite and also upon the thoroughness of the mixing. In case the calcined bauxite be crushed in such a way as to afford a highly regular gradation of particles and mixed in such a way as to avoid segregation thereof it is possible to use much less binder than would be required by a less thoroughly graded mixture. Likewise the amount of water should be as small as will serve thoroughly to moisten all the ingredients and this again requires thorough mixing. As a concrete example of a highly satisfactory formula for molds of medium size, I will instance the following: calcined bauxite 60%, raw bauxite 10%, graphite 30%.

Whatever mixture is used is preferably passed through a pug mill repeatedly until thoroughly incorporated together, then stored in a moist place for a considerable length of time preferably several days, after which it is ready for use. It will keep any desired length of time provided only that it be inclosed in a reasonably air-tight container so as not to become dried out. In making molds therefrom, the pattern is first dusted with graphite or the like adhesion-preventing substance and partings are managed the same way as in sand molding. It is even easier to make molds with match plates than it is with patterns. The mold is then dried slowly until the easily evaporated water is driven off after which it is burned in the same way as any ceramic articles. The temperature of burning may be anywhere between 800° C. and 1,800° C., preferably about 1,000° C.

Reference has heretofore been made as to the possibility of reinforcing this material. My preferred method is to make the mold right inside the ordinary metal flasks which not only constitute a support for the mold but provide the necessary handles therefor and facilitate the matching of the different parts.

It will be understood that I do not limit myself to any of the details herein described except as set forth in the claims hereto annexed.

Having thus described my invention, what I claim is:—

1. A composition of matter for the manufacture of permanent molds for metal founders' use consisting essentially of calcined bauxite crushed to graded sizes mixed with graphite and a suitable binder.

2. A composition of matter for the manufacture of permanent molds for metal founders' use consisting essentially of calcined bauxite crushed to graded sizes, graphite and a binder consisting largely of raw pulverized bauxite and water.

3. A composition of matter for the manufacture of permanent molds for metal founders' use containing from about 40% to about 75% of calcined bauxite, 20% to 40% of graphite and the remainder a refractory binding material.

4. A composition of matter for the manufacture of permanent molds for metal founders' use containing from about 40% to about 75% of crushed calcined bauxite, about 5% to about 20% of pulverized raw bauxite, and about 20% to about 40% of a surfacing, softening material.

5. A permanent mold for metal founders' use consisting of a burned mixture of calcined bauxite, raw bauxite and a surfacing material.

6. A permanent mold for metal founders' use made of a burned mixture of calcined bauxite, raw bauxite and graphite.

7. A permanent mold for metal founders' use made of a burned mixture containing a predominating amount of calcined bauxite, from about 20% to about 40% of graphite and the balance a refractory binder.

In testimony whereof, I hereunto affix my signature.

HAROLD G. WEIDENTHAL.